(12) United States Patent
Kim et al.

(10) Patent No.: US 7,362,393 B2
(45) Date of Patent: Apr. 22, 2008

(54) FOUR COLOR LIQUID CRYSTAL DISPLAY

(75) Inventors: Chang-Yeong Kim, Yongin-si (KR); Mun-Pyo Hong, Seongnam-si (KR); Seong-Deok Lee, Yongin-si (KR); Nam-Seok Roh, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 215 days.

(21) Appl. No.: 10/550,238

(22) PCT Filed: Mar. 24, 2004

(86) PCT No.: PCT/KR2004/000659
§ 371 (c)(1),
(2), (4) Date: Sep. 23, 2005

(87) PCT Pub. No.: WO2004/086128
PCT Pub. Date: Oct. 7, 2004

(65) Prior Publication Data
US 2006/0262251 A1 Nov. 23, 2006

(30) Foreign Application Priority Data
Mar. 24, 2003 (KR) ............ 10-2003-0018196

(51) Int. Cl.
*G02F 1/1335* (2006.01)
(52) U.S. Cl. .............. 349/106; 349/108; 349/109
(58) Field of Classification Search ............ 349/106, 349/108, 109
See application file for complete search history.

(56) References Cited

U.S. PATENT DOCUMENTS 5,142,392 A * 8/1992 Ueki et al. ............... 349/111
5,642,176 A * 6/1997 Abukawa et al. ......... 349/106
6,833,888 B2 * 12/2004 Song et al. ............... 349/106
6,989,876 B2 * 1/2006 Song et al. ............... 349/109

FOREIGN PATENT DOCUMENTS

| JP | 02245733 A | * | 10/1990 |
| JP | 04-355722 A | | 12/1992 |
| JP | 04-371923 A | | 12/1992 |
| JP | 05-18113 A | | 7/1993 |
| JP | 10-10517 A | | 1/1998 |

OTHER PUBLICATIONS

Patent Abstracts of Japan, No. 10-010517, Jan. 16, 1998, 1 page.

* cited by examiner

*Primary Examiner*—Andrew Schechter
*Assistant Examiner*—John Heyman
(74) *Attorney, Agent, or Firm*—Edward C. Kwok; MacPherson Kwok Chen & Heid LLP

(57) ABSTRACT

A four color liquid crystal display is provided, which includes: a plurality of first and second dots arranged in a matrix, pixels each of the first dots including three primary color pixels and each of the second dots including two primary color pixels and a white pixel, each pixel including a pixel electrode and a switching element; a plurality of gate lines extending in a row direction for transmitting a gate signal to the switching elements; and a plurality of data lines extending in a column direction for transmitting data signals to the switching elements, wherein the first dots and the second dots are alternately arranged both in a row direction and in a column direction.

14 Claims, 10 Drawing Sheets

FOUR COLOR LIQUID CRYSTAL DISPLAY

TECHNICAL FIELD

The present invention relates to a four color liquid crystal display.

BACKGROUND ART

Generally, a liquid crystal display (LCD) includes a liquid crystal panel assembly including two panels provided with two kinds of field generating electrodes such as pixel electrodes and a common electrode and a liquid crystal layer with dielectric anisotropy interposed therebetween. The variation of the voltage difference between the field generating electrodes, i.e., the variation in the strength of an electric field generated by the electrodes changes the transmittance of the light passing through the LCD, and thus desired images are obtained by controlling the voltage difference between the electrodes.

The LCD includes a plurality of pixels with pixel electrodes and red (R), green (G) and blue (B) color filters. The pixels are driven to perform display operation by way of the signals applied thereto through display signal lines. The signal lines include gate lines (or scanning signal lines) for carrying the scanning signals, and data lines for carrying data signals. Each pixel has a thin film transistor (TFT) connected to one of the gate lines and one of the data lines to control the data signals applied to the pixel electrode.

Meanwhile, there are several types of arrangement of the red (R), green (G) and blue (B) color filters. Examples are a stripe type where the color filters of the same color are arranged in the same pixel columns, a mosaic type where the red, green and blue color filters are arranged in turn along the row and column directions, and a delta type where the pixels are arranged zigzag in the column direction and the red, green and blue color filters are arranged in turn. The delta type correctly represents a circle or a diagonal line.

Since the luminance of a conventional LCD is relatively poor, a four color LCD including white pixels are suggested. The addition of the white pixels decreases color concentration and yields the decrease of other pixels, in particular, blue pixels when maintaining the resolution. For the striped arrangement, the addition of the white pixels also requires additional data lines. For the mosaic arrangement, the addition of the white pixels reduces the number of the data lines but increases the number of the gate lines twice.

A technique called sub-pixel rendering may improve the reduction of color concentration, the increase of the data lines in the striped arrangement, and the increase of the gate lines in the mosaic arrangement. However, since the resolution in the row direction is decreased compared with actual resolution, the rendering is not inadequate for a monitor displaying fine images such as texts although it is proper to motion images displayed by TV, etc.

DISCLOSURE OF INVENTION

Technical Problem

A motivation of the present invention is to solve the problems of the conventional LCD.

Technical Solution

A four color liquid crystal display is provided, which includes: a plurality of first and second dots arranged in a matrix, each of the first dots including three primary color pixels and each of the second dots including two primary color pixels and a white pixel, each pixel including a pixel electrode and a switching element; a plurality of gate lines extending in a row direction for transmitting a gate signal to the switching elements; and a plurality of data lines extending in a column direction for transmitting data signals to the switching elements, wherein the first dots and the second dots are alternately arranged both in a row direction and in a column direction.

The three primary color pixels in the first dots may include red, green and blue pixels.

The two primary color pixels in the second dots may include red and green pixels. The red, green, and blue pixels included in the first dot are arranged in sequence and the red, green, and white pixels in the second dot are arranged in sequence. Alternatively, the red, blue, and green pixels included in the first dot are arranged in sequence and the red, white, and green pixels in the second dot are arranged in sequence. The blue pixels and the white pixels are preferably rendered The two primary color pixels included in the second dots include green and blue pixels. The red, green, and blue pixels included in the first dots are arranged in sequence and the white, green, and blue pixels in the second dots are arranged in sequence. Alternatively, the red, blue, and green pixels included in the first dots are arranged in sequence and the white, blue, and green pixels in the second dots are arranged in sequence. The red pixels and the white pixels are preferably rendered A four color liquid crystal display is provided, which includes: a plurality of first to third dots arranged in a matrix, each of the first dots including red, green, and blue pixels, each of the second dots including red, green, and white pixels, and each of the third dots including green, blue, and white pixels, each pixel including a pixel electrode and a switching element; a plurality of gate lines extending in a row direction for transmitting a gate signal to the switching elements; and a plurality of data lines extending in a column direction for transmitting data signals to the switching elements, wherein the first dots and the second dots are alternately arranged in a row direction, the first dots and the third dots are alternately arranged in the row direction, the first dots are arranged adjacent to each other in a column direction, and the second and the third dots are alternately arranged in the column direction.

The red, green, and blue pixels included in the first dots are arranged in sequence, the red, green, and white pixels in the second dots are arranged in sequence, and the white, green, and blue pixels in the third dots are arranged in sequence. Alternatively, the red, blue, and green pixels included in the first dots are arranged in sequence, the red, white, and green pixels in the second dots are arranged in sequence, and the white, blue, and green pixels in the third dots are arranged in sequence.

The blue pixels and the white pixels are rendered and the red pixels and the white pixel are rendered

Advantageous Effects

This simplifies the data conversion of three color image data into four color image data and gives a sub-pixel rendering effect.

3
DESCRIPTION OF DRAWINGS

The present invention will become more apparent by describing embodiments thereof in detail with reference to the accompanying drawings in which.

BEST MODE

Figure 1:
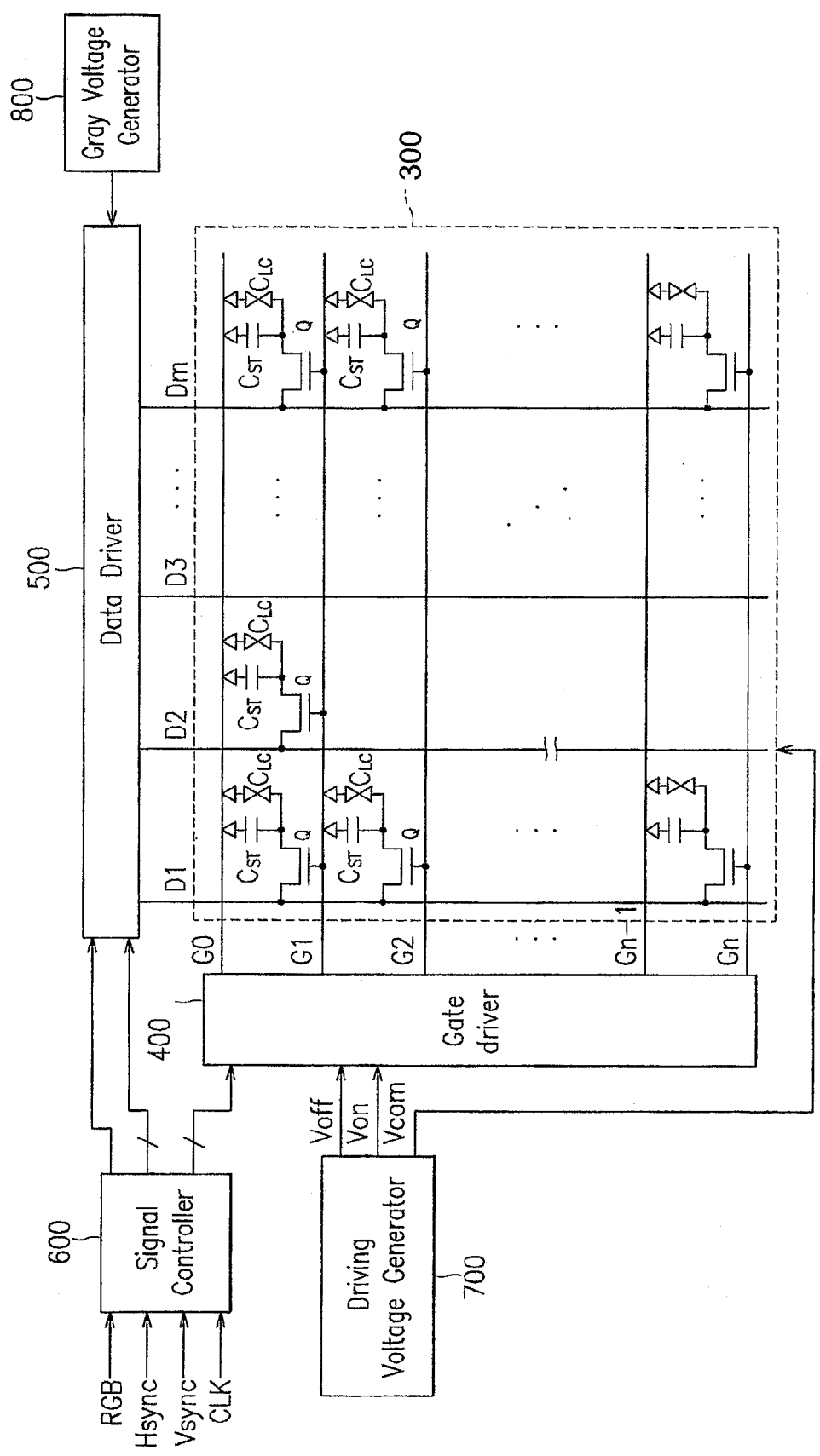
FIG. 1 is a block diagram of an LCD according to an embodiment of the present invention.

The present invention now will be described more fully hereinafter with reference to the accompanying drawings, in which preferred embodiments of the inventions are shown.

In the drawings, the thickness of layers and regions are exaggerated for clarity. Like numerals refer to like elements throughout. It will be understood that when an element such as a layer, region or substrate is referred to as being 'on' another element, it can be directly on the other element or intervening elements may also be present. In contrast, when an element is referred to as being 'directly on' another element, there are no intervening elements present.

Now, LCDs thereof according to embodiments of this invention will be described in detail with reference to the accompanying drawings.

Figure 2:
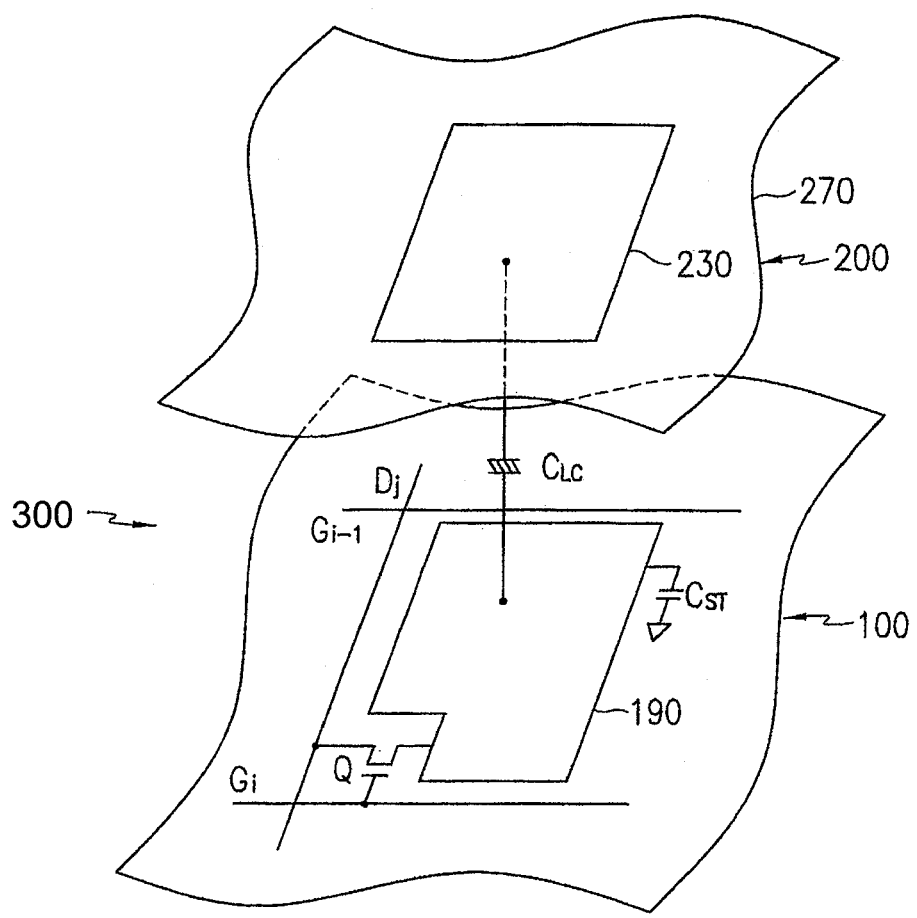
FIG. 2 is an equivalent circuit diagram of a pixel of an LCD according to an embodiment of the present invention.

FIG. 1 is a block diagram of an LCD according to an embodiment of the present invention and FIG. 2 is an equivalent circuit diagram of a pixel of an LCD according to an embodiment of the present invention.

Referring to FIG. 1, an LCD according to an embodiment of the present invention includes a LC panel assembly 300, a gate driver 400 and a data driver 500 which are connected to the panel assembly 300, a gray voltage generator 800 connected to the data driver 500, and a signal controller 600 controlling the above elements.

The LC panel assembly 300, in structural view shown in FIG. 2, includes a lower panel 100, an upper panel 200 and a liquid crystal layer 3 interposed therebetween while it includes a plurality of display signal lines $G_1$-$G_n$.sub.n and $D_1$-$D_m$ and a plurality of pixels connected thereto and arranged substantially in a matrix in circuital view shown in FIGS. 1 and 2.

The display signal lines $G_1$-$G_n$ and $D_1$-$D_m$ are provided on the lower panel 100 and include a plurality of gate lines $G_1$-$G_n$ transmitting gate signals (called scanning signals) and a plurality of data lines $D_1$-$D_m$ transmitting data signals. The gate lines $G_1$-$G_n$ extend substantially in a row direction and are substantially parallel to each other, while the data lines $D_1$-$D_m$ substantially in a column direction and are substantially parallel to each other.

Each pixel includes a switching element Q connected to the display signal lines $G_1$-$G_n$ and $D_1$-$D_m$, and an LC capacitor $C_{LC}$ and a storage capacitor $C_{ST}$ that are connected to the switching element Q. The storage capacitor $C_{ST}$ may be omitted if unnecessary.

The switching element Q such as a TFT is provided on the lower panel 100 and has three terminals: a control terminal connected to one of the gate lines $G_1$-$G_n$; an input terminal connected to one of the data lines $D_1$-$D_m$; and an output terminal connected to the LC capacitor $C_{LC}$ and the storage capacitor $C_{ST}$.

The LC capacitor $C_{LC}$ includes a pixel electrode 190 on the lower panel 100, a common electrode 270 on the upper panel 200, and the LC layer 3 as a dielectric between the electrodes 190 and 270. The pixel electrode 190 is connected to the switching element Q, and the common electrode 270 covers the entire surface of the upper panel 200 and is supplied with a common voltage Vcom. Alternatively, both the pixel electrode 190 and the common electrode 270, which have shapes of bars or stripes, are provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel represents its own color by providing one of a plurality of color filters 230 in an area occupied by the pixel electrode 190. The color filter 230 shown in FIG. 2 is provided in the corresponding area of the upper panel 200. Alternatively, the color filter 230 is provided on or under the pixel electrode 190 on the lower panel 100.

The color of the color filter 230 is one of the primary colors such as red, green blue, and white. Hereinafter, a pixel is referred to as red, greed, blue or white pixel based on the color represented by the pixel and indicated by reference numeral R, G, B or W, which is also used to indicate a pixel area occupied by the pixel. The white pixel W may have no color filter.

A pair of polarizers (not shown) polarizing incident light are attached on the outer surfaces of the panels 100 and 200 of the panel assembly 300.

An exemplary spatial arrangement of pixels of LCDs according to an embodiment of the present invention is described with reference to FIGS. 3 and 4.

Figure 3:
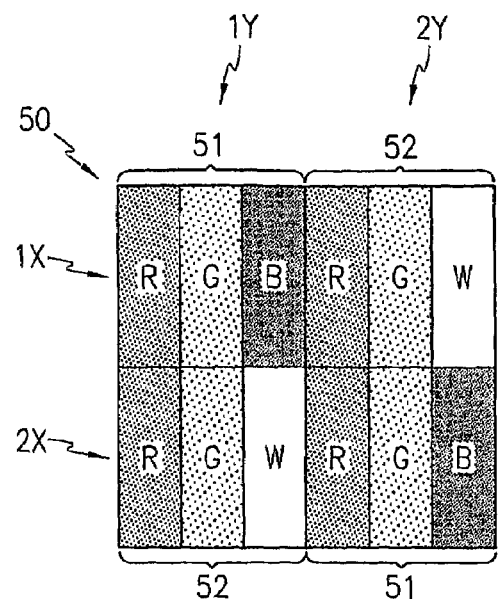
FIGS. 3 and 4 illustrate a spatial arrangement of pixels of an LCD according to an embodiment of the present invention.
Figure 4:
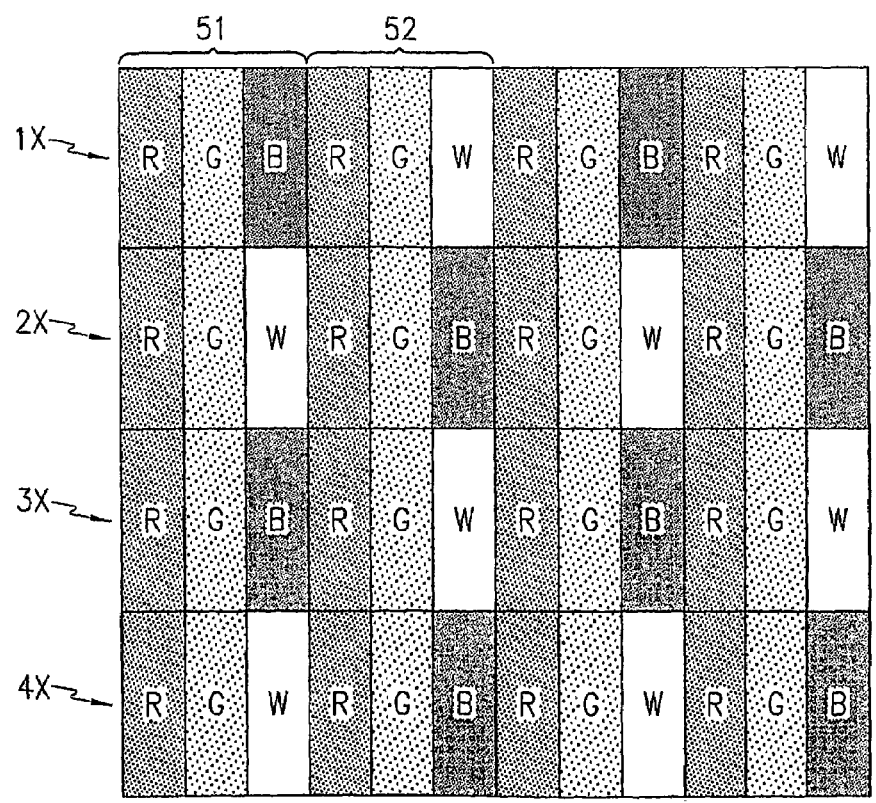

FIGS. 3 and 4 illustrate an arrangement of pixels of LCDs according to an embodiment of the present invention.

Referring to FIGS. 3 and 4, a plurality of pixels are arranged in a matrix including a plurality of pixel row and a plurality of pixel columns.

Each pixel row includes pixels representing four colors, i.e., red pixels R, green pixels G, blue pixels B, and white pixels W. The sequence of the pixels in a pixel row is the red pixel R, the green pixel G, and the blue/white pixel B/W.

The pixel columns include a plurality of bicolor columns and a plurality of unicolor columns. Each bicolor column includes blue pixels B and white pixels W and each unicolor column includes either red pixels R or green pixels G.

A group of pixels including a red pixel R, a green pixel G, and a blue pixel B that are sequentially arranged in a row is referred to as a blue dot 51, and a group of pixels including a red pixel R, a green pixel G, and a white pixel W that are sequentially arranged in a row is referred to as a white dot 52. Then, the blue dots 51 and the white dots 52 are alternately arranged both in the row direction and in the column direction.

Let us consider a set 50 of dots arranged in a 2×2 matrix as shown in FIG. 3. A blue dot 51 and a white dot 52 are sequentially arranged in a first row 1X, while a white dot 52 and a blue dot 51 are sequentially arranged in a second row 2X. Similarly, a blue dot 51 and a white dot 52 are sequentially arranged in a first column 1Y, while a white dot 52 and a blue dot 51 are sequentially arranged in a second column 2X.

The dot set 50 shown in FIG. 3 is repeatedly arranged in the row direction and the column direction as shown in FIG. 4.

In this arrangement, the number of the blue pixels B or the white pixels W is half of the number of the red pixels R or the green pixels G. In addition, the resolution of the red and the green pixels R and G in the LCD shown in FIGS. 3 and 4 is equal to that of three-color LCD. However, the resolution of the blue pixels is decreased since additional white pixels substitute some of the blue pixels. Accordingly, the blue pixels B and the white pixels are rendered, which is called two color rendering.

Figure 5A:
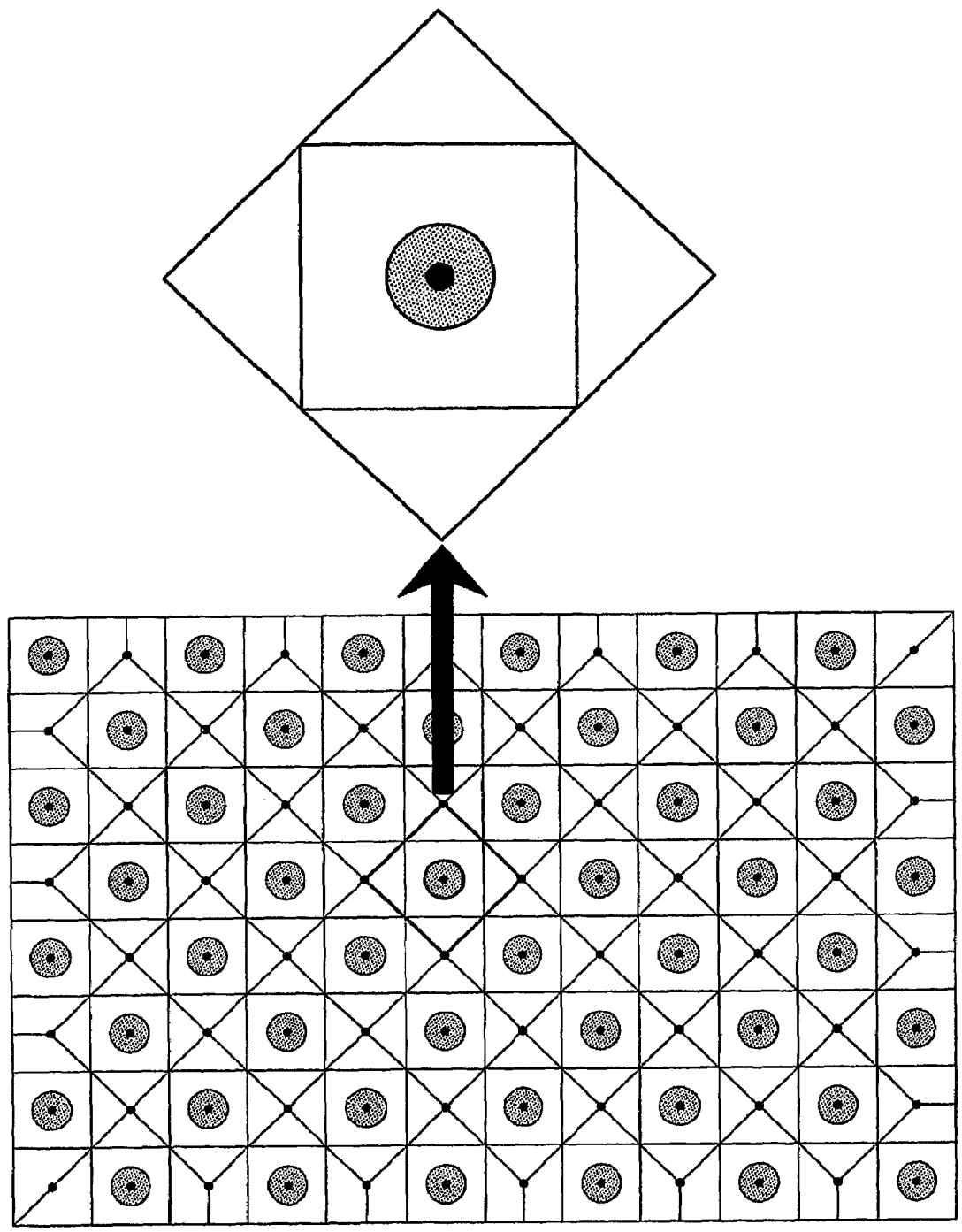
FIGS. 5A and 5B illustrate an example of two-color rendering according to an embodiment of the present invention.
Figure 5B:
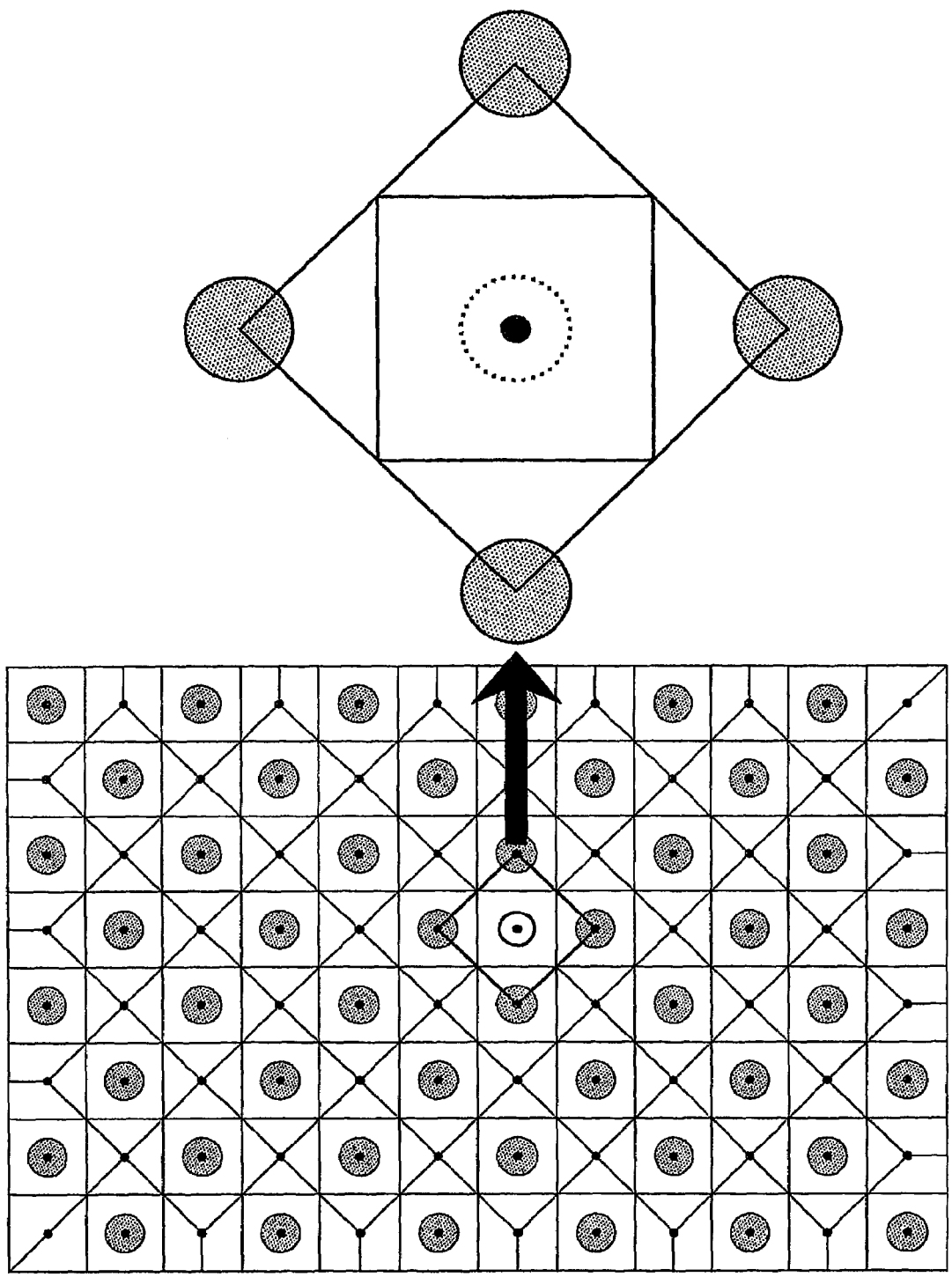

FIGS. 5A and 5B illustrate an example of two-color rendering according to an embodiment of the present invention. In FIGS. 5A and 5B, squares including hatched circles indicate blue pixels and the other squares indicate white pixels. Diamonds are logical pixels that have black points indicating data sample points.

Referring to FIG. 5A, a blue data for a blue pixel is distributed to the blue pixel and neighboring white pixels in the logical pixel including the blue pixel. Similarly, referring to FIG. 5B, a white data for a white pixel is distributed to the white pixel and neighboring blue pixels in the logical pixel including the white pixel. Here, the white data for the white pixel is actually a blue data for a blue pixel that have been existent before being substituted by the white pixel.

This two color rendering simplifies the data conversion of three color image data into four color image data and gives a sub-pixel rendering effect.

Since the variation of the amount of the blue light is relatively insensitive to a person compared with red and green light, and hence, the influence of the reduction of the blue pixels B on the image quality is relatively small. The decrease of the blue light is compensated by using a backlight lamp that emits light including increased blue component. In addition, since the white pixels W only contributes to the luminance without changing the color, it does not affect on the image quality.

An exemplary detailed structure of a TFT array panel for an LCD according to an embodiment of the present invention will be described with reference to FIGS. 6 and 7.

Figure 6:
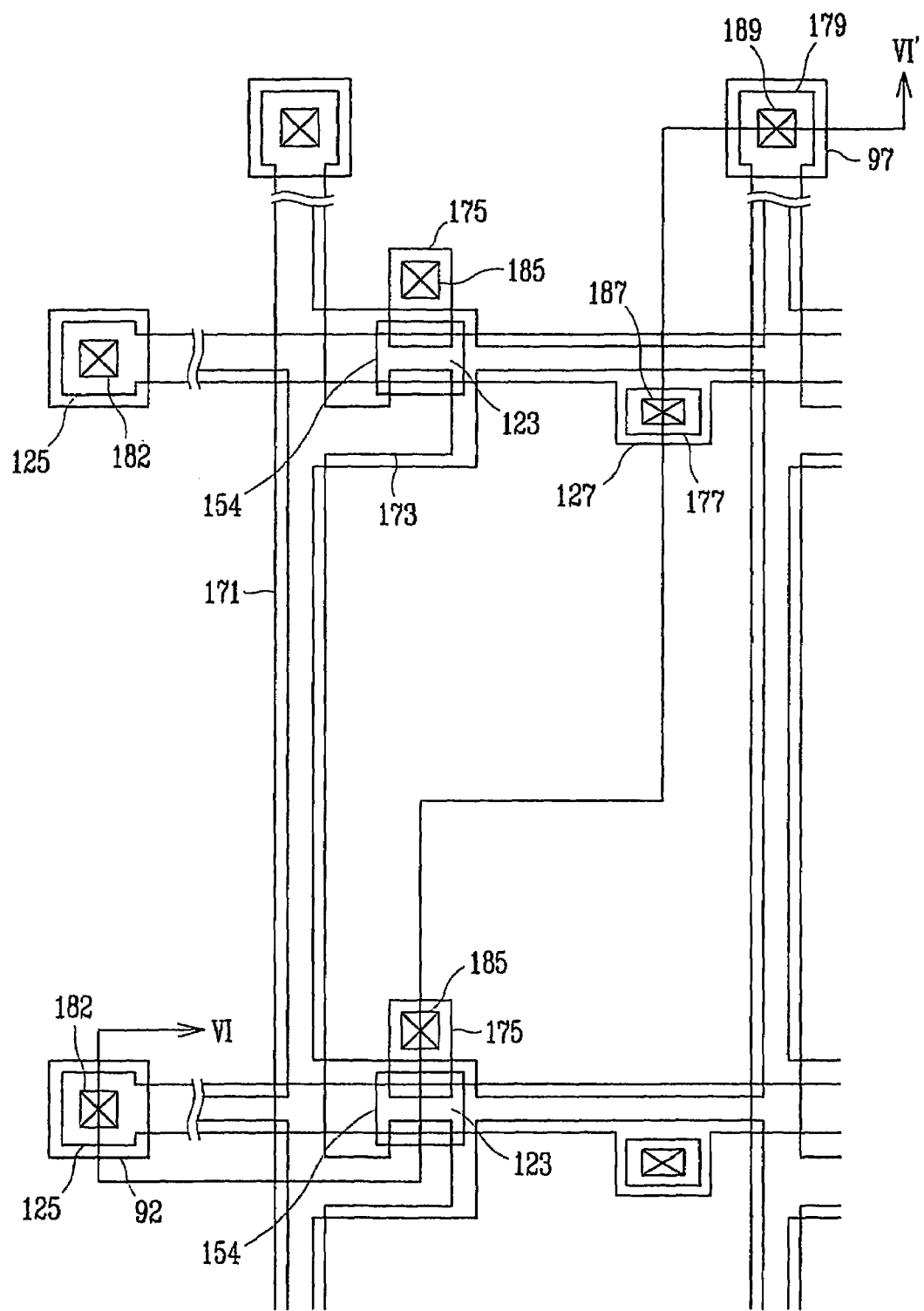
FIG. 6 is a layout view of an exemplary TFT array panel for an LCD according to an embodiment of the present invention.
Figure 7:
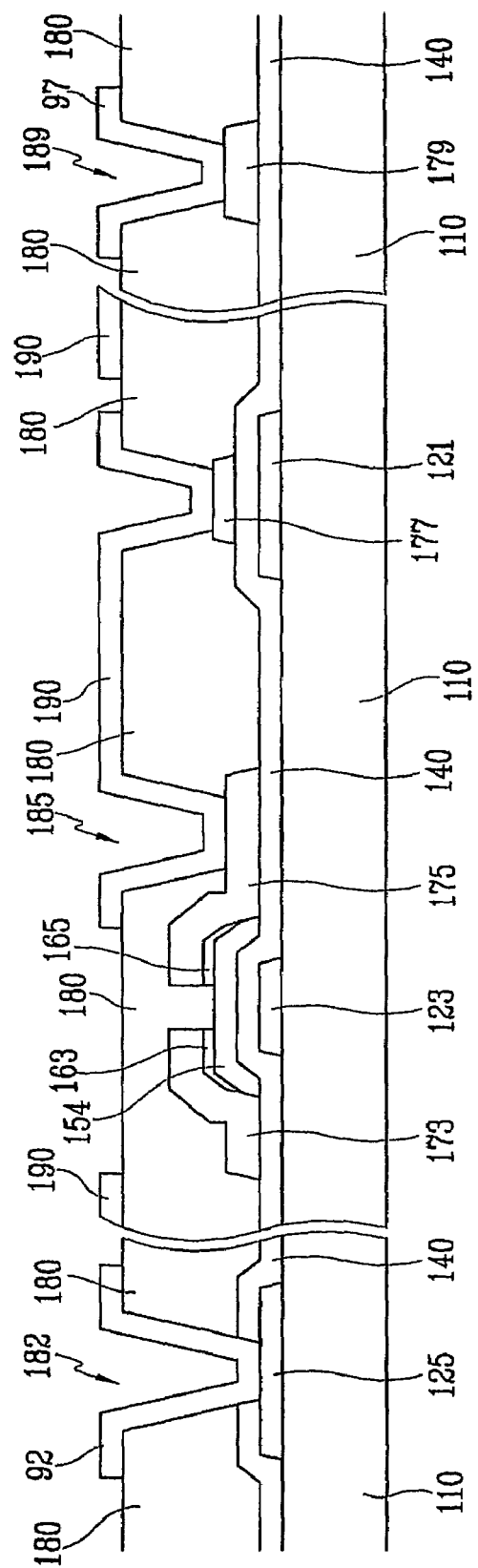
FIG. 7 is a sectional view of the TFT array panel shown in FIG. 5 taken along the line VI-VI'.

FIG. 6 is a layout view of an exemplary TFT array panel for an LCD according to an embodiment of the present invention, and FIG. 7 is a sectional view of the TFT array panel shown in FIG. 6 taken along the line VII-VII'.

A plurality of gate lines 121 for transmitting gate signals are formed on an insulating substrate 110. Each gate line 121 extends substantially in a transverse direction and a plurality of portions of each gate line 121 form a plurality of gate electrodes 123. Each gate line 121 includes a plurality of expansions 127 protruding downward The gate lines 121 include a low resistivity conductive layer preferably made of Ag containing metal such as Ag and Ag alloy or Al containing metal such as Al and Al alloy. The gate lines 121 may have a multilayered structure including a low resistivity conductive layer and another layer preferably made of Cr, Ti, Ta, Mo or their alloys such as MoW alloy having good physical, chemical and electrical contact characteristics with other materials such as ITO (indium tin oxide) and IZO (indium zinc oxide). A good exemplary combination of such layers is Cr and Al—Nd alloy.

The lateral sides of the gate lines 121 are tapered, and the inclination angle of the lateral sides with respect to a surface of the substrate 110 ranges about 30-80 degrees.

A gate insulating layer 140 preferably made of silicon nitride (SiNx) is formed on the gate lines 121.

A plurality of semiconductor islands 154 preferably made of hydrogenated amorphous silicon (abbreviated to 'a-Si') are formed on the gate insulating layer 140.

A plurality of ohmic contact islands 163 and 165 preferably made of silicide or n+hydrogenated a-Si heavily doped with n type impurity are formed on the semiconductor islands 154. The ohmic contact islands 163 and 165 are located in pairs on the semiconductor islands 154.

The lateral sides of the semiconductor islands 154 and the ohmic contacts 163 and 165 are tapered, and the inclination angles thereof are preferably in a range between about 30-80 degrees.

A plurality of data lines 171, a plurality of drain electrodes 175, and a plurality of storage capacitor conductors 177 are formed on the ohmic contacts 163 and 165 and the gate insulating layer 140.

The data lines 171 for transmitting data voltages extend substantially in the longitudinal direction and intersect the gate lines 121. A plurality of branches of each data line 171, which extend toward the drain electrodes 175, form a plurality of source electrodes 173. Each pair of the source electrodes 173 and the drain electrodes 175 are separated from each other and opposite each other with respect to a gate electrode 123. A gate electrode 123, a source electrode 173, and a drain electrode 175 along with a semiconductor island 154 form a TFT having a channel formed in the semiconductor island 154 disposed between the source electrode 173 and the drain electrode 175.

The storage capacitor conductors 177 overlap the expansions 127 of the gate lines 121.

The data lines 171, the drain electrodes 175, and the storage capacitor conductors 177 also include a low resistivity conductive layer preferably made of Ag containing metal such as Ag and Ag alloy or Al containing metal such as Al and Al alloy. The data lines 171, the drain electrodes 175, and the storage capacitor conductors 177 may have a multilayered structure including a low resistivity conductive layer and another layer preferably made of Cr, Ti, Ta, Mo or their alloys such as MoW alloy having good physical, chemical and electrical contact characteristics with other materials such as ITO (indium tin oxide) and IZO (indium zinc oxide). A good exemplary combination of such layers is Cr and Al—Nd alloy.

The lateral sides of the data lines 171, the drain electrodes 175, and the storage capacitor conductors 177 are tapered, and the inclination angle of the lateral sides with respect to a surface of the substrate 110 ranges about 30-80 degrees.

The ohmic contacts 163 and 165 interposed only between the underlying semiconductor islands 154 and the overlying data lines 171 and the overlying drain electrodes 175 thereon and reduce the contact resistance therebetween.

A passivation layer 180 is formed on the data lines 171, the drain electrodes 175, the storage conductors 177, and the exposed portions of the semiconductor islands 154. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride. Alternatively, the passivation layer 180 may includes both a SiNX film and an organic film.

The passivation layer 180 has a plurality of contact holes 185, 187 and 189 exposing the drain electrodes 175, the storage conductors 177, and end portions 179 of the data lines 171, respectively. The passivation layer 180 and the gate insulating layer 140 has a plurality of contact holes 182 exposing end portions 125 of the gate lines 121.

A plurality of pixel electrodes 190 and a plurality of contact assistants 92 and 97, which are preferably made of IZO or ITO, are formed on the passivation layer 180.

The pixel electrodes 190 are physically and electrically connected to the drain electrodes 175 through the contact holes 185 and to the storage capacitor conductors 177 through the contact holes 187 such that the pixel electrodes 190 receives the data voltages from the drain electrodes 175 and transmits the received data voltages to the storage capacitor conductors 177.

Referring back to FIG. 2, the pixel electrodes 190 supplied with the data voltages generate electric fields in cooperation with the common electrode 270 on the other panel 200, which reorient liquid crystal molecules in the liquid crystal layer 3 disposed therebetween.

As described above, a pixel electrode 190 and a common electrode 270 form a liquid crystal capacitor $C_{LC}$, which stores applied voltages after turn-off of the TFT Q. An additional capacitor called a 'storage capacitor,' which is connected in parallel to the liquid crystal capacitor $C_{LC}$, is provided for enhancing the voltage storing capacity. The storage capacitors are implemented by overlapping the pixel electrodes 190 with the gate lines 121 adjacent thereto (called 'previous gate lines'). The capacitances of the storage capacitors, i.e., the storage capacitances are increased by providing the expansions 127 at the gate lines 121 for increasing overlapping areas and by providing the storage capacitor conductors 177, which are connected to the pixel electrodes 190 and overlap the expansions 127, under the pixel electrodes 190 for decreasing the distance between the terminals.

The pixel electrodes 190 overlap the gate lines 121 and the data lines 171 to increase aperture ratio but it is optional.

The contact assistants 92 and 97 are connected to the exposed end portions 125 of the gate lines 121 and the exposed end portions 179 of the data lines 171 through the contact holes 182 and 189 respectively. The contact assistants 92 and 97 are not requisites but preferred to protect the exposed portions 125 and 179 and to complement the adhesiveness of the exposed portion 125 and 179 and external devices.

According to another embodiment of the present invention, the pixel electrodes 190 are made of transparent conductive polymer. For a reflective or transflective LCD, the pixel electrodes 190 include opaque reflective metal.

Referring back to FIG. 1, the gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines $G_1$-$G_n$ of the panel assembly 300 and synthesizes the gate-on voltage Von and the gate off voltage Voff from an external device to generate gate signals for application to the gate lines $G_1$-$G_n$.

The data driver 500 is connected to the data lines $D_1$-$D_m$ of the panel assembly 300 and applies data voltages selected from the gray voltages supplied from the gray voltage generator 800 to the data lines $D_1$-$D_m$.

The signal controller 600 controls the drivers 400 and 500.

Now, the operation of the LCD will be described in detail.

The signal controller 600 is supplied with three-color image signals R, G and B and input control signals controlling the display thereof such as a vertical synchronization signal Vsync, a horizontal synchronization signal Hsync, a main clock MCLK, and a data enable signal DE, from an external graphic controller (not shown). The signal controller 610 converts the three-color image signals R, G and B into four-color image signals and processes the four-color image signals suitable for the operation of the panel assembly 300 on the basis of the input control signals and the input image signals R, G and B. In addition, the signal controller 600 generates gate control signals CONT 1 and data control signals CONT2 for controlling the processed and modified image signals. The signal controller 600 provides the gate control signals CONT1 for the gate driver 400, and the processed image signals and the data control signals CONT2 for the data driver 500. The processing of the signal controller 600 includes the sub-pixel rendering.

The gate control signals CONT1 include a vertical synchronization start signal STV for informing of start of a frame, a gate clock signal CPV for controlling the output time of the gate-on voltage Von, and an output enable signal OE for defining the width of the gate-on voltage Von. The data control signals CONT2 include a horizontal synchronization start signal STH for informing of start of a horizontal period, a load signal LOAD or TP for instructing to apply the appropriate data voltages to the data lines $D_1$-$D_m$, an inversion control signal RVS for reversing the polarity of the data voltages (with respect to the common voltage Vcom) and a data clock signal HCLK.

The data driver 500 receives a packet of the image data for a pixel row from the signal controller 600 and converts the image data into the analog data voltages selected from the gray voltages supplied from the gray voltage generator 800 in response to the data control signals CONT2 from the signal controller 600. The data driver 500 then outputs the data voltages to the data lines $D_n$-$D_m$.

Responsive to the gate control signals CONT1 supplied from the signals controller 600, the gate driver 400 applies the gate-on voltage Von to the gate line $G_1$-$G_n$, thereby turning on the switching elements Q connected thereto. The data voltages applied to the data lines $D_1$-$D_m$ are supplied to the pixels through the activated switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage and the orientations determine the polarization of light passing through the LC capacitor $C_{LC}$. The polarizers convert the light polarization into the light transmittance.

By repeating this procedure by a unit of a horizontal period (which is indicated by 1H and equal to one period of the horizontal synchronization signal Hsync, the data enable signal DE, and a gate clock signal), all gate lines $G_1$-$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is called 'frame inversion'). The inversion control signal RVS may be also controlled such that the polarity of the data voltages flowing in a data line in one frame are reversed (which is called 'line inversion'), or the polarity of the data voltages in one packet are reversed (which is called 'dot inversion').

MODE FOR INVENTION

Other exemplary spatial arrangements of pixels of LCDs according to embodiments of the present invention are described with reference to FIGS. 8-12.

FIGS. 8-12 illustrate pixel arrangements of LCDs according to embodiments of the present invention.

Referring to FIGS. 8-12, a plurality of pixels are arranged in a matrix including a plurality of pixel row and a plurality of pixel columns, and each pixel each pixel row includes pixels representing four colors, i.e., red pixels R, green pixels G, blue pixels B, and white pixels W. The pixel columns include a plurality of bicolor columns and a plurality of unicolor columns.

Figure 8:
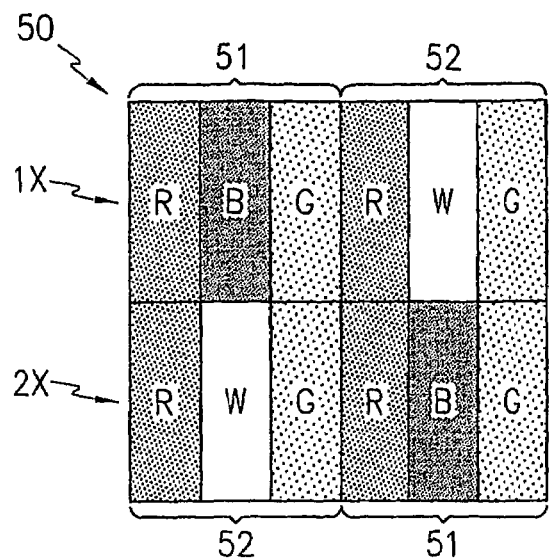
FIGS. 8-12 illustrate spatial arrangements of pixels of LCDs according to embodiments of the present invention.

Referring to FIG. 8 the sequence of the pixels in a pixel row is the red pixel R, the blue/white pixel B/W, and the green pixel G.

Each bicolor column includes blue pixels B and white pixels W and each unicolor column includes either red pixels R or green pixels G.

A group of pixels including a red pixel R, a blue pixel B, and a green pixel G that are sequentially arranged in a row is referred to as a blue dot 51, and a group of pixels including a red pixel R, a white pixel W, and a green pixel G that are sequentially arranged in a row is referred to as a white dot 52. Then, the blue dots 51 and the white dots 52 are alternately arranged both in the row direction and in the column direction.

Let us consider a set 50 of dots arranged in a 2×2 matrix as shown in FIG. 8. A blue dot 51 and a white dot 52 are sequentially arranged in a first row 1X, while a white dot 52 and a blue dot 51 are sequentially arranged in a second row 2X. Similarly, a blue dot 51 and a white dot 52 are sequentially arranged in a first column 1Y, while a white dot 52 and a blue dot 51 are sequentially arranged in a second column 2X.

The dot set 50 shown in FIG. 8 is repeatedly arranged in the row direction and the column direction.

In this arrangement, the number of the blue pixels B or the white pixels W is half of the number of the red pixels R or the green pixels G. The two color rendering is performed for the blue pixels B and the white pixels W for increasing the resolution.

Figure 9:
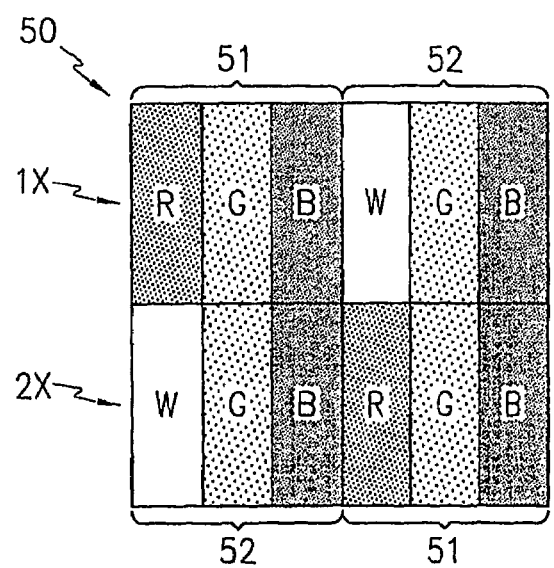

Referring to FIG. 9, the sequence of the pixels in a pixel row is the red/white pixel R/W, the green pixel G, and the blue pixel B.

Each bicolor column includes red pixels R and white pixels W and each unicolor column includes either green pixels G or blue pixels B.

A group of pixels including a red pixel R, a green pixel G, and a blue pixel B that are sequentially arranged in a row is referred to as a red dot 51, and a group of pixels including a white pixel W, a green pixel G, and a blue pixel B that are sequentially arranged in a row is referred to as a white dot 52. Then, the red dots 51 and the white dots 52 are alternately arranged both in the row direction and in the column direction.

Let us consider a set 50 of dots arranged in a 2×2 matrix as shown in FIG. 8. A red dot 51 and a white dot 52 are sequentially arranged in a first row 1X, while a white dot 52 and a red dot 51 are sequentially arranged in a second row 2X. Similarly, a red dot 51 and a white dot 52 are sequentially arranged in a first column 1Y, while a white dot 52 and a red dot 51 are sequentially arranged in a second column 2X.

The dot set 50 shown in FIG. 9 is repeatedly arranged in the row direction and the column direction.

In this arrangement, the number of the red pixels R or the white pixels W is half of the number of the green pixels G or the blue pixels R. The two color rendering is performed for the red pixels R and the white pixels W for increasing the resolution.

Figure 10:
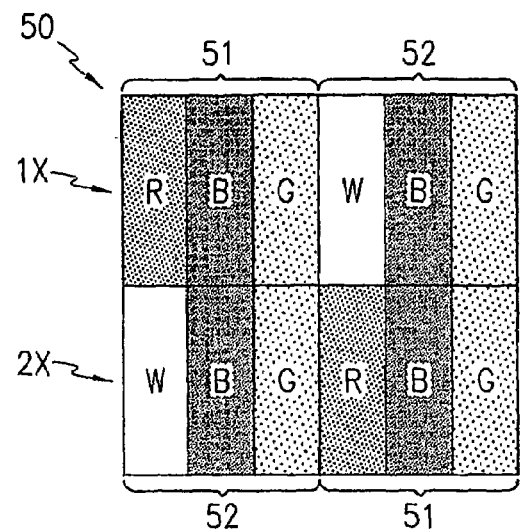

Referring to FIG. 10, the sequence of the pixels in a pixel row is the red/white pixel R/W, the green pixel G, and the blue pixel B.

Each bicolor column includes red pixels R and white pixels W and each unicolor column includes either green pixels G or blue pixels B.

A group of pixels including a red pixel R, a blue pixel B, and a green pixel G that are sequentially arranged in a row is referred to as a red dot 51, and a group of pixels including a white pixel W, a blue pixel B, and a green pixel G that are sequentially arranged in a row is referred to as a white dot 52. Then, the red dots 51 and the white dots 52 are alternately arranged both in the row direction and in the column direction.

Let us consider a set 50 of dots arranged in a 2×2 matrix as shown in FIG. 10. A red dot 51 and a white dot 52 are sequentially arranged in a first row 1X, while a white dot 52 and a red dot 51 are sequentially arranged in a second row 2X. Similarly, a red dot 51 and a white dot 52 are sequentially arranged in a first column 1Y, while a white dot 52 and a red dot 51 are sequentially arranged in a second column 2X.

The dot set 50 shown in FIG. 10 is repeatedly arranged in the row direction and the column direction.

In this arrangement, the number of the red pixels R or the white pixels W is half of the number of the green pixels G or the blue pixels R. The two color rendering is performed for the red pixels R and the white pixels W for increasing the resolution.

Figure 11:
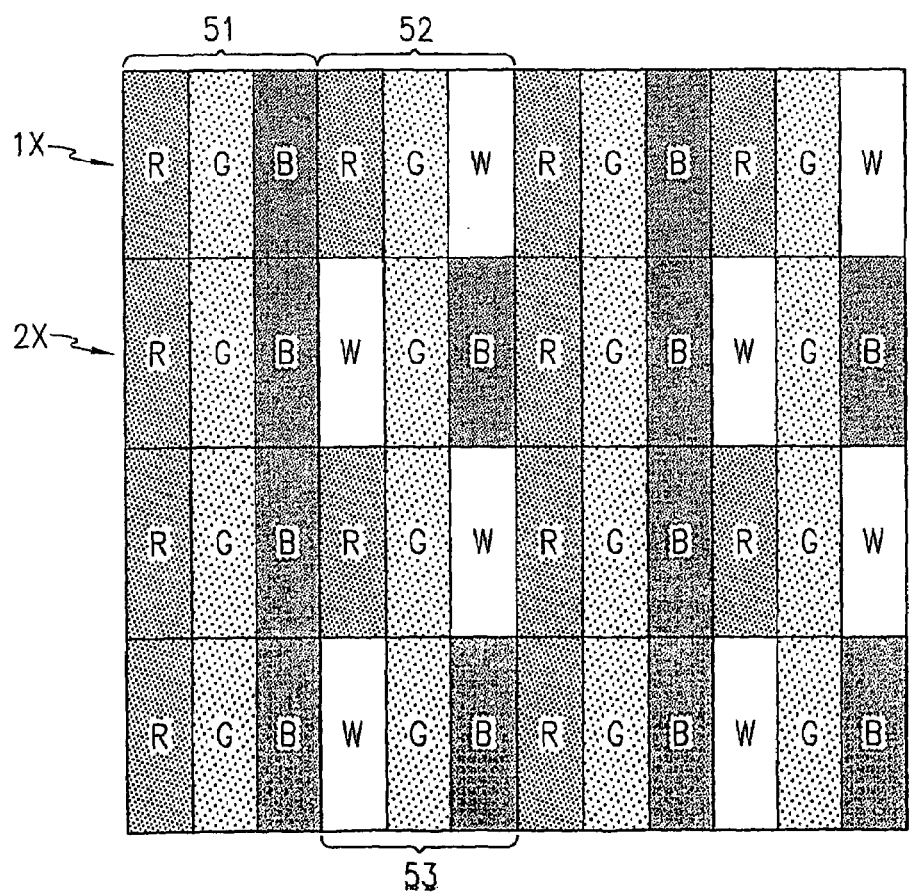

Referring to FIG. 11, the sequence of the pixels in a pixel row is the red pixel R, the green pixel G, and the blue pixel B; the red pixel R, the green pixel G, and the white pixel W; or the white pixel W, the green pixel G, and the blue pixel B.

Each bicolor column includes either red pixels R and white pixels W or blue pixels B and white pixels W and each unicolor column includes one of red pixels R, green pixels G and blue pixels B.

A group of pixels including a red pixel R, a green pixel G, and a blue pixel B that are sequentially arranged in a row is referred to as a normal dot 51, a group of pixels including a red pixel R, a green pixel G, and a white pixel W that are sequentially arranged in a row is referred to as a blueless dot 52, and a group of pixels including a white pixel W, a green pixel G, and a blue pixel B that are sequentially arranged in a row is referred to as a redless dot 53. Then, the normal dots 51 and the blueless/redless dots 52/53 are alternately arranged in the row direction. The normal dots 51 form their own columns (referred to as 'unidot columns' hereinafter), while the blueless dots 52 and the redless dots 53 are alternately arranged in the column direction to form 'bidot columns.' The unidot columns and the bidot columns are alternately arranged Referring to FIG. 11, let us consider a set of dots arranged in a 2×2 matrix. A normal dot 51 and a blueless dot 52 are sequentially arranged in a first row 1X, while a normal dot 51 and a redless dot 53 are sequentially arranged in a second row 2X. On the contrary, normal dots 51 are arranged in a first column, while a blueless dot 52 and a redless dot 53 are sequentially arranged in a second column.

The dot set is repeatedly arranged in the row direction and the column direction.

In this arrangement, the number of the red pixels R or the blue pixels B is three fourths of the number of the green pixels G, and the number of the white pixels W is half of the number of the green pixels G or the blue pixels R. The two color rendering is performed for the red pixels R and the white pixels W and the blue pixels B and the white pixels W.

Figure 12:
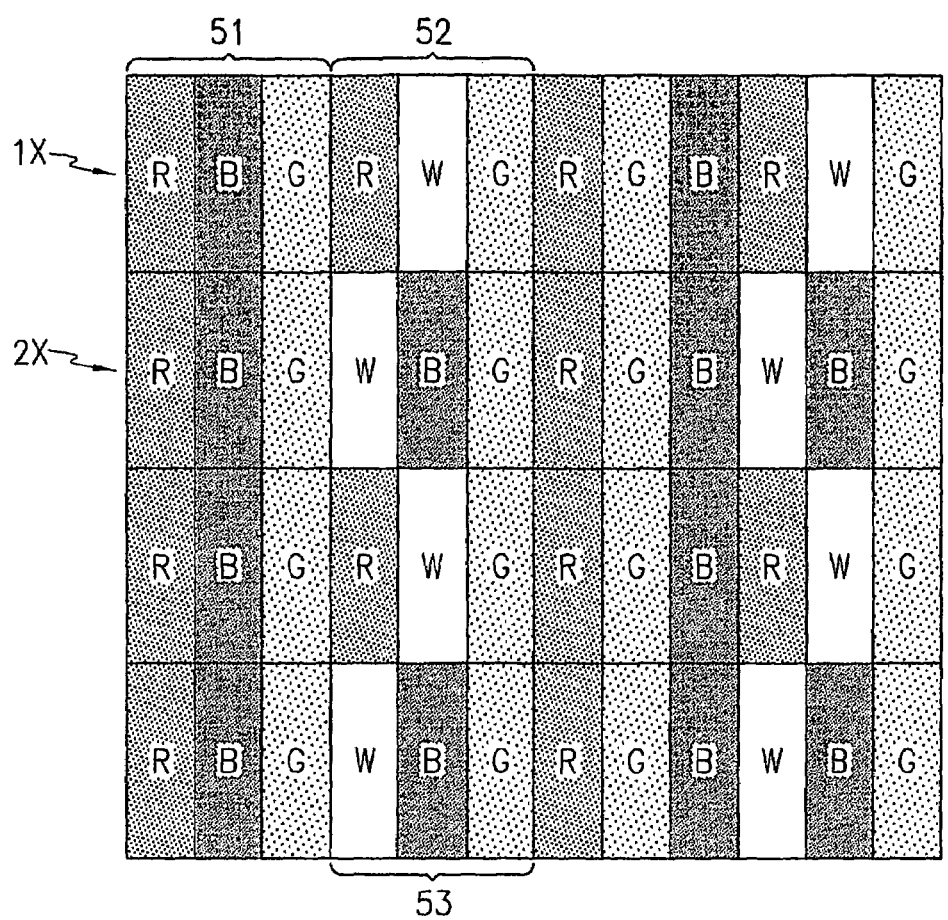

Referring to FIG. 12, the sequence of the pixels in a pixel row is the red pixel R, the blue pixel B, and the green pixel G; the red pixel R, the white pixel W, and the green pixel G; or the white pixel W, the blue pixel B, and the green pixel G.

Each bicolor column includes either red pixels R and white pixels W or blue pixels B and white pixels W and each unicolor column includes one of red pixels R, green pixels G and blue pixels B.

A group of pixels including a red pixel R, a blue pixel B, and a green pixel G that are sequentially arranged in a row is referred to as a normal dot 51, a group of pixels including a red pixel R, a white pixel W, and a green pixel G that are sequentially arranged in a row is referred to as a blueless dot 52, and a group of pixels including a white pixel W, a blue pixel B, and a green pixel G that are sequentially arranged in a row is referred to as a redless dot 53. Then, the normal dots 51 and the blueless/redless dots 52/53 are alternately arranged in the row direction. The normal dots 51 form their own unidot columns, while the blueless dots 52 and the redless dots 53 are alternately arranged in the column direction to form bidot columns. The unidot columns and the bidot columns are alternately arranged.

Referring to FIG. 12, let us consider a set of dots arranged in a 2×2 matrix. A normal dot 51 and a blueless dot 52 are sequentially arranged in a first row 1X, while a normal dot 51 and a redress dot 53 are sequentially arranged in a second row 2X. On the contrary, normal dots 51 are arranged in a first column, while a blueless dot 52 and a redless dot 53 are sequentially arranged in a second column.

The dot set is repeatedly arranged in the row direction and the column direction.

In this arrangement, the number of the red pixels R or the blue pixels B is three fourths of the number of the green pixels G, and the number of the white pixels W is half of the number of the green pixels G or the blue pixels R. The two color rendering is performed for the red pixels R and the white pixels W and the blue pixels B and the white pixels W.

The number of the red pixels R may be varied to be different from the number of the blue pixels B without changing the number of the white pixels W. For example, the number of the red pixels R may be seven eights of the number of the green pixels G, and the number of the blue pixels B may be five eights of the number of the green pixels G.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A four color liquid crystal display comprising:
a plurality of first and second dots arranged in a matrix, each of the first dots consisiting of three primary color pixels and each of the second dots consisting of two primary color pixels and a white pixel, each pixel including a pixel electrode and a switching element;
a plurality of gate lines extending in a row direction for transmitting a gate signal to the switching elements; and
a plurality of data lines extending in a column direction for transmitting data signals to the switching elements,
wherein the first dots and the second dots are alternately arranged both in a row direction and in a column direction.

2. The liquid crystal display of claim 1, wherein the three primary color pixels in the first dots include red, green and blue pixels.

3. The liquid crystal display of claim 2, wherein the two primary color pixels in the second dots include red and green pixels.

4. The liquid crystal display of claim 3, wherein the red, green, and blue pixels included in the first dot are arranged in sequence and the red, green, and white pixels in the second dot are arranged in sequence.

5. The liquid crystal display of claim 3, wherein the red, blue, and green pixels included in the first dot are arranged in sequence and the red, white, and green pixels in the second dot are arranged in sequence.

6. The liquid crystal display of claim 3, wherein the blue pixels and the white pixels are rendered.

7. The liquid crystal display of claim 2, wherein the two primary color pixels included in the second dots include green and blue pixels.

8. The liquid crystal display of claim 7, wherein the red, blue, and green pixels included in the first dots are arranged in sequence and the white, blue, and green pixels in the second dots are arranged in sequence.

9. The liquid crystal display of claim 7, wherein the red pixels and the white pixels are rendered.

10. A four color liquid crystal display comprising:
a plurality of first to third dots arranged in a matrix, each of the first dots consisiting of red, green, and blue pixels, each of the second dots consisting of red, green, and white pixels, and each of the third dots consisting of green, blue, and white pixels, each pixel including a pixel electrode and a switching element;
a plurality of gate lines extending in a row direction for transmitting a gate signal to the switching elements; and
a plurality of data lines extending in a column direction for transmitting data signals to the switching elements,
wherein the first dots and the second dots are alternately arranged in a row direction, the first dots and the third dots are alternately arranged in the row direction, the first dots are arranged adjacent to each other in a column direction, and the second and the third dots are alternately arranged in the column direction.

11. The liquid crystal display of claim 10, wherein the red, green, and blue pixels included in the first dots are arranged in sequence, the red, green, and white pixels in the second dots are arranged in sequence, and the white, green, and blue pixels in the third dots are arranged in sequence.

12. The liquid crystal display of claim 10, wherein the red, blue, and green pixels included in the first dots are arranged in sequence, the red, white, and green pixels in the second dots are arranged in sequence, and the white, blue, and green pixels in the third dots are arranged in sequence.

13. The liquid crystal display of claim 3, wherein the blue pixels and the white pixels are rendered and the red pixels and the white pixel are rendered.

14. The liquid crystal display of claim 7, wherein the red, green, and blue pixels included in the first dots are arranged in sequence and the white, green, and blue pixels in the second dots are arranged in sequence.

* * * * *